United States Patent Office 3,208,996
Patented Sept. 28, 1965

3,208,996
2-HYDROXYETHYL 6-AMINO-6,8-DIDEOXY-7-O-METHYL-1-THIO-D-GALACTO-OCTOPYRANO-SIDE AND AMINO AND FATTY ACID ACYL DERIVATIVES
Herman Hoeksema, Kalamazoo, Mich., assignor to The Upjohn Company, Kalamazoo, Mich., a corporation of Delaware
No Drawing. Filed May 6, 1963, Ser. No. 278,410
13 Claims. (Cl. 260—210)

This invention relates to novel compositions of matter and to processes for the preparation thereof, and is particularly directed to 2-hydroxyethyl 6-amino-6,8-dideoxy-7-O-methyl-1-thio-D-galacto-octopyranoside, to novel amino acid acyl and fatty acid acyl derivatives thereof, and to processes for producing the same.

The 2-hydroxyethyl 6-amino-6,8-dideoxy-7-O-methyl-1-thio-D-galacto-octopyranoside of this invention has the following formula:

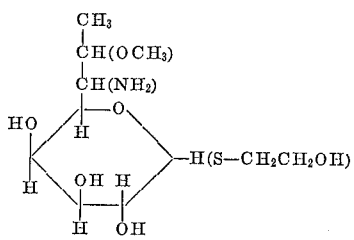

(I)

It is the hydroxyethyl glycoside of an aminothio sugar which has been given the trivial name of thiocelestosamine. An alternative and shorter name, therefore, is β-hydroxyethylthiocelestosaminide which may be abbreviated to β-HTC, and it is this terminology which will be used throughout this specification.

The oxygen analog of thiocelestosamine, celestosamine, is disclosed in U.S. Patent 2,851,463 where it is referred to as celestose.

In its relatively pure crystalline form, β-hydroxyethylthiocelestosaminide is characterized by an optical rotation of $[\alpha]_D^{25} = +262°$ (c.=1 in water); in infrared absorption spectrum in Nujol mull as follows: 3400 (sh.), 3250, 1600, 1400, 1325, 1310, 1290, 1240, 1195, 1160, 1150 (sh.), 1110, 1075, 1045, 1038, 1005, 980, 920, 895, 862, 825, 796, 740, 711, and 690 cm.$^{-1}$; an equivalent weight of 297 and a pKa of 7.2; and the following elemental analysis.

Calculated for $C_{11}H_{23}NO_6S$: C, 44.43; H, 7.80; N, 4.71; S, 10.78. Found: C, 44.20; H, 7.78; N, 4.97; S, 10.68.

β-Hydroxyethylthiocelestosaminide is obtained by hydrazinolysis of celesticetin or desalicetin (U.S. Patents 2,928,844 and 2,851,463). Celesticetin, or desalicetin, either as the free base or an acid addition salt thereof, is brought into contact with hydrazine, advantageously as the hydrate, until substantial hydrazinolysis is obtained. The hydrazinolysis takes place at room temperature (25-35° C.) but higher or lower temperature, say 0° to 120° C., can be used. The proportions of celesticetin or desalicetin can be varied, but at least the stoichiometric amount of hydrazine is necessary to effect complete hydrazinolysis. Advantageously, an excess of hydrazine is used as a solvent for the reaction. The β-HTC is initially recovered as the hydrazine solvate which can be converted to non-solvated β-HTC either by dissolution in a high-boiling (90–170° C.) inert solvent, for example, dimethylformamide, followed by evaporation of said solvent by boiling to a more concentrated solution, or by heating in a vacuum at about 100° C. for about 5 to 40 hours.

β-Hydroxyethylthiocelestosaminide exists either in the non-protonated (free base) form or the protonated (salt) form depending upon the pH of the environment. It forms stable protonates (acid addition salts) by neutralization of the free base with an acid or by metathesis between the protonated form of β-HTC and the anion of an acid. Suitable acids for this purpose include hydrochloric, sulfuric, phosphoric, acetic, succinic, citric, lactic, maleic, fumaric, pamoic, cholic, palmitic, mucic camphoric, glutaric, glycolic, phthalic, tartaric, lauric, stearic, salicylic, 3-phenylsalicylic, 5-phenylsalicylic, 3-methyl glutaric, ortho-sulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, azobenzenesulfonic, octadecylsulfuric, pecric, and like acids. These acid addition salts are useful in upgrading the free base. β-HTC also forms salts with penicillin. These salts have solubility characteristics which cause them to be useful in the isolation and purification of pencillins, particularly benzylpenicillin.

β-Hydroxyethylthiocelestosaminide is a new amino sugar thioglycoside which is useful for the preparation of antibacterial substances and surface active materials, and for the resolution of racemic acids. For example, β-HTC can be acylated, as will be more particularly described, to form antibacterial substances and surface active materials. Also, β-HTC can be reacted with racemic acids to form diastereoisomeric acid addition salts which can be separated by fractional crystallization into diastereoisomers from which the optically active acids can be generated. β-HTC also is useful as an intermediate. It reacts with isocyanates to form urethanes and ureas, and can be used to modify polyurethane resins. For example, it can be reacted with an excess of toluene diisocyanate to form a prepolymer which can then be reacted with the polyol ethers and polyol esters commonly used to form polyurethanes; or β-HTC can be mixed with the polyol compound and the mixture then reacted with toluene diisocyanate. β-HTC can also be reacted with ethylene oxide, propylene oxide, and like alkylene oxides to form polyoxyalkylene β-HTC which can be reacted with toluene diisocyanate to form a polyurethane. β-HTC is particularly useful for producing rigid polyurethane foams. It also condenses with formaldehyde, especially when the thiocyanic acid addition salt is employed, to form polymers according to U.S. Patents 2,425,320 and 2,606,155 which are useful as pickling inhibitors. Its fluosilicic acid addition salt is also useful as a mothproofing agent in accordance with U.S. Patents 1,915,334 and 2,075,359.

The invention is also directed to novel N-acyl derivatives of β-HTC, for example, N-acyl-β-hydroxyethylthiocelestosaminide wherein the acyl is the acyl radical of a naturally occuring α-amino acid selected from the class consisting or arginine, lysine, histidine, valine, leucine, isoleucine, phenylalanine, threonine, methionine, tryptophan, hydroxyproline, aspartic acid, glutamic acid, hydroxy glutamic acid, lysine, alanine, norleucine, serine, cystine, tyrosine, proline and cysteine; and wherein the acyl is the acyl radical of a fatty acid of from 1 to 18 carbon atoms, inclusive, for example, formic, acetic, capric, lauric, myristic, stearic, acrylic, oleic, sorbic, and linoleic acid.

The N-acyl derivatives of β-HTC are obtained by reacting β-HTC with an acylating agent under conditions to effect preferential acylation of the amino group. Thus, by reacting β-HTC with one molar proportion of an acylating agent, for example, an hydride, acid halide, ester, or mixed anhydride of the desired acid, the N-acyl derivative of β-HTC is obtained. When β-HTC is acylated by α-amino acids, the α-amino group should first be protected to prevent it from undergoing undesirable reactions.

Protective groups for this purpose are well known in the art and are exemplified by trifluoroacetyl, carbobenzoxy, carbo-t-butoxy, triphenylmethyl, and the like.

Other methods used to effect the acylation of β-HTC are standard procedures employed in peptide synthesis and include the use of a reactive acid azide or a carbodiimide reagent. (See Sheehan and Hess, J.A.C.S. 1955, 77, 1067.)

When β-HTC is acylated with amino acids, the acylating agent is advantageously a mixed anhydride of the desired amino acid and a non-reactive acid, i.e., an acid whose acyl group in the mixed anhydride does not react with β-HTC. Suitable such acids are the hypothetical ethyl hydrogen carbonate and like hypothetical monoesters of carbonic acid such as the loweralkyl and loweralkoxyalkyl hydrogen carbonates, p-toluenesulfonic acid and the like. These mixed anhydrides are obtained by reacting the desired protected amino acid with an acyl halide of the non-reactive acid, for example, ethyl chlorocarbonate or p-toluenesulfonyl chloride. The formation of these mixed anhydrides and the acylation of β-HTC with them are advantageously effected in the presence of an acid binding agent, for example, pyridine, triethylamine, or other basic tertiary amine. The acylation is ordinarily carried out at room temperature (25–30° C.) but can be carried out at temperatures up to about 100° C. when the reaction velocity is slow. Temperatures down to −10° C. can be used if the reaction velocity is high. Lower temperatures, e.g., between about −10° and 25° C. are most advantageously used with the anhydrides and acid halides and the higher temperatures, e.g., between about 25 and 100° C. with the esters. While any ester of the acylating acid can be used, the highly reactive esters such as the p-nitrophenyl and cyanomethyl esters are preferred. When β-HTC is acylated by an amino acid with a protected α-amino group, the protecting group can be removed by catalytic hydrogenation, mild acid or alkaline hydrolysis.

The N-acyl derivatives are useful for upgrading impure β-HTC. Thus, impure β-HTC can be acylated by the procedures given above, the N-acylated-β-HTC recovered and purified, and the β-HTC regenerated by hydrazinolysis or alkaline hydrolysis.

The long chain fatty acid N-acyl derivatives, for example, N-lauroyl-β-HTC, have surface active properties and are useful as wetting and emulsifying agents. The N-acyl derivatives are reactive with isocyanates and can be used as modifying agents for polyurethanes. For example, the N-acyl-β-HTC's can be reacted with an excess of toluene diisocyanate to form a prepolymer which then can be reacted with the polyol ethers and polyol esters commonly used for forming polyurethanes, or the N-acyl-β-HTC's can be mixed with the polyol component and this mixture then reacted with toluene diisocyanate. They can also be reacted with ethylene oxide or propylene oxide, and like alkylene oxides to form polyoxyalkylene N-acyl-β-HTC which can be reacted with toluene diisocyanate to form a polyurethane. The N-acyl-β-HTC's are particularly useful for producing rigid polyurethane foams.

The following examples are illustrative of the process and products of the present invention but are not to be construed as limiting. All percentages are by weight and all solvent mixture proportions are by volume unless otherwise noted.

Example 1.—β-Hydroxyethylthiocelestosaminide (β-HTC) hydrazine solvate

A mixture of 5 gm. (0.0094 mole) of celesticetin (Example 3, U.S. Patent 2,928,844) and 25 ml. (excess) of hydrazine hydrate was heated under reflux for 21 hours. The excess hydrazine was removed by distillation in vacuo and the residue was crystallized from 35 ml. of absolute ethanol. White crystals (1.2 gm.) of β-hydroxyethylthiocelestosaminide hydrazine solvate were obtained which melted at 98–108° C. Recrystallization from absolute ethanol gave 0.65 gm. having an optical rotation of $[\alpha]_D^{25} = +243°$ (c.=0.8, water); an infrared absorption spectrum in Nujol mull at the following frequencies: 3400, 1630, 1600, 1460, 1450 (sh.), 1305, 1275, 1260, 12,00, 1115, 1085, 1055, 1010, 978, 950, 925, 910, 873, 800–820, 705, 690, and 68 cm.$^{-1}$; an equivalent weight of 161 with two basic groups having pKa's in the region of 7.5; and the following elemental analysis.

Calculated for $C_{11}H_{23}NO_6S \cdot N_2H_4$: C, 40.11; H, 8.26; N, 12.76; S, 9.74. Found: C, 40.15; H, 8.04; N, 11.69; S, 9.56.

Example 2.—β-Hydroxyethylthiocelestosaminide hydrazine solvate

Desalicetin (Example 1, U.S. Patent 2,851,463) (10 gm.) was dissolved in hydrazine hydrate (100 cc.) and heated under reflux in an oil bath at 165° C. for 18 hours. The almost colorless solution was concentrated to dryness on a steam bath, first at fifteen mm., and finally at less than 1 mm., giving a solid residue which was triturated with acetonitrile, filtered, and washed with the same solvent. Crystallization from ethanol gave colorless needles (2.64 gm.) of β-hydroxyethylthiocelestosaminide hydrazine solvate. Recrystallization from the same solvent gave crystals of β-hydroxyethylthiocelestosaminide hydrazine solvate which had an equivalent weight of 168 with two basic groups having pKa's in the region of 7.5; an optical rotation of $[\alpha]_D^{25} = +248°$ (c.=1.95% ethanol); and the following elemental analysis.

Calculated for $C_{11}H_{23}NO_6S \cdot N_2H_4$: C, 40.11; H, 8.26; N, 12.76; S, 9.74. Found: C, 40.27; H, 7.95; N, 11.63; S, 9.80.

The IR spectrum showed identity with that obtained in Example 1.

Example 3.—β-Hydroxyethylthiocelestosaminide (β-HTC)

A solution of 2 gm. of β-hydroxyethylthiocelestosaminide hydrazine solvate, prepared as in Example 1 or Example 2, in 30 ml. of dimethylformamide was concentrated to a volume of about 10 ml. and then diluted with 10 ml. of dimethylformamide. Ether was added until cloudiness resulted, and 500 mg. of β-hydroxyethylthiocelestosaminide was deposited. The crystalline β-hydroxyethylthiocelestosaminide had an optical rotation of $[\alpha]_D^{25} + 262°$ (c.=1, in water); an infrared absorption spectrum at the following frequencies: 3400 (sh.), 3250, 1600, 1400, 1325, 1310, 1290, 1240, 1195, 1160, 1150 (sh.), 1110, 1100, 1075, 1045, 1038, 1005, 980, 920, 895, 862, 825, 796, 740, 711, and 690 cm.$^{-1}$; an equivalent weight of 297 and a pKa of 7.2; and the following elemental analysis.

Calculated for $C_{11}H_{23}NO_6S$: C, 44.43; H, 7.80; N, 4.71; S, 10.78. Found: C, 44.20; H, 7.78; N, 4.97; S, 10.68.

Example 4.—N-lauroyl-β-hydroxyethylthiocelestosaminide

A solution of 66 mg. (0.0002 mole) of β-hydroxyethylthiocelestosaminide in 2 ml. of water was treated with 0.1 ml. of 2 N potassium hydroxide solution and 50 mg. (0.0002 mole) of lauroyl chloride. This material was shaken for 1 minute and a white precipitate of N-lauroyl-β-hydroxyethylthiocelestosaminide was obtained.

By substituting the lauroyl chloride by a halide or anhydride of other fatty acids e.g., formic (mixed anhydride with acetic acid), acetic, capric, lauric, myristic, acrylic, oleic, sorbic and linoleic acid, there are obtained the corresponding fatty acid acyl derivatives of β-hydroxyethylthiocelestosaminide.

Example 5.—Phenylalanyl-β-hydroxyethylthiocelestosaminide

To 1.96 g. (6.6 m. eq.) of β-hydroxyethylthiocelestosaminide in 50 ml. of dimethylformamide (dried over calcium hydride) is added 2.5 g. (6.6 m. eq.) of N-trifluoroacetylphenylalanine p-nitrophenylester at 100° C. This solution is stored for 16 hrs. at room temperature. The solvent is removed by evaporation under reduced pressure, and the residue is triturated with ether. This residue is then dissolved in 75 ml. of conc. ammonium hydroxide and heated for 3 hours on the steam bath, then freeze-dried. The phenylalanyl - β-hydroxyethylthiocelestosaminide is crystallized from a mixture of hydrochloric acid, water, and acetone. The infrared spectrum shows OH/NH absorption in the region of 3350 cm.$^{-1}$ and amide I and II absorptions near 1660 and 1555, respectively.

*Example 6*

By substituting the N-trifluoroacetylphenylalanine p-nitrophenylester in Example 5 by the p-nitrophenylester of an N-trifluoroacetyl-α-amino acid selected from the class consisting of arginine, lysine, histidine, valine, leucine, isoleucine, threonine, methionine, trytophan, hydroxyproline, aspartic acid, glutamic acid, hydroxy glutamic acid, glycine, alanine, norleucine, serine, cystine, tyrosine, proline, and cysteine there are obtained the corresponding N-α-aminoacyl derivatives of β-hydroxyethylthiocelestosaminide.

I claim:

1. A member of the group consisting of β-hydroxyethylthiocelestosaminide, a compound having the formula:

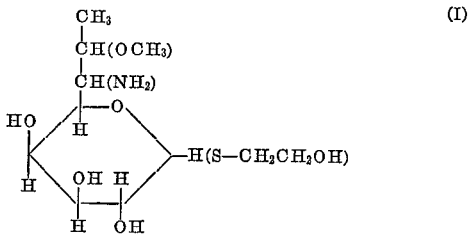

and being characterized in its essentially pure crystalline form by
  (a) an optical rotation of $[\alpha]_D^{25}=+262°$ (c.=1, water);
  (b) an elemental analysis as follows: C, 44.20; H, 7.78; N, 4.97; S, 10.68;
  (c) an infrared absorption spectrum as follows: 3400 (sh.), 3250, 1600, 1400, 1325, 1310, 1290, 1240, 1195, 1160, 1150 (sh.), 1110, 1100, 1075, 1045, 1038, 1005, 980, 920, 895, 862, 825, 796, 740, 711, and 690 cm.$^{-1}$; and
  (d) an equivalent weight of 297 and a pKa of 7.2, the hydrazine solvate, and the acid addition salts thereof.

2. An N-acylate of the compound characterized in claim 1 wherein the acyl is an acyl radical of a naturally occurring α-amino acid selected from the class consisting of arginine, lysine, histidine, valine, leucine, isoleucine, phenylalanine, threonine, methionine, tryptophan, hydroxyproline, aspartic acid, glutamic acid, hydroxy glutamic acid, lysine, alanine, norleucine, serine, cystine, tyrosine, proline, and cysteine.

3. An N-acylate of the compound characterized in claim 1 wherein the acyl is an acyl radical of a fatty acid of from 1 to 18 carbon atoms, inclusive.

4. A compound of claim 2 wherein acyl is phenylalanyl.

5. A compound of claim 3 wherein acyl is lauroyl.

6. A process which comprises (1) subjecting a compound selected from the group consisting of desalicetin and celesticetin to hydrazinolysis with hydrazine hydrate to form β-hydroxyethylthiocelestosaminide hydrazine solvate, (2) treating the β-hydroxyethylthiocelestosaminide hydrazine solvate with a solvent for β-hydroxyethylthiocelestosaminide having a boiling point of 90–170° C. to obtain unsolvated β-hydroxyethylthiocelestosaminide, and (3) eracting β-hydroxyethylthiocelestosaminide with an acylating agent to form N-acyl-β-hydroxyethylthiocelestosaminide.

7. A process which comprises (1) subjecting a compound selected from the group consisting of desalicetin and celesticetin to hydrazinolysis with hydrazine hydrate to form β-hdroxyethylthiocelestosaminide hydrazine solvate, (2) treating the β-hydroxyethylthiocelestosaminide hydrazine solvate with a solvent for β-hydroxyethylthiocelestosaminide having a boiling point of 90–170° C. to obtain unsolvated β-hydroxyethylthiocelestosaminide, and (3) reacting β-hydroxyethylthiocelestosaminide with an acylating agent to form N-acyl-β-hydroxyethylthiocelestosaminide wherein the acyl is the acyl radical of a naturally occurring α-amino acid selected from the class consisting of arginine, lysine, histidine, valine, leucine, isoleucine, phenylalanine, threonine, methionine, tryptophan, hydroxyproline, aspartic acid, glutamic acid, hydroxy glutamic acid, lysine, alanine, norleucine, serine, cystine, tyrosine, proline and cysteine.

8. A process which comprises (1) subjecting a compound selected from the group consisting of desalicetin and celesticetin to hydrazinolysis with hydrazine hydrate to form β-hydroxyethylthiocelestosaminide hydrazine solvate, (2) treating the β-hydroxyethylthiocelestosaminide hydrazine solvate with a solvent for β-hydroxyethylthiocelestosaminide having a boiling point of 90–170° C. to obtain unsolvated β-hydroxyethylthiocelestosaminide, and (3) reacting β-hydroxyethylthiocelestosaminide with an acylating agent to form N-acyl-β-hydroxyethylthiocelestosaminide wherein the acyl is the acyl radical of a fatty acid of from 1 to 18 carbon atoms, inclusive.

9. A process which comprises (1) subjecting a compound selected from the group consisting of desalicetin and celesticetin to hydrazinolysis with hydrazine hydrate to form β-hydroxyethylthiocelestosaminide hydrazine solvate, and (2) treating the β-hydroxyethylthiocelestosaminide hydrazine solvate with a solvent for β-hydroxyethylthiocelestosaminide having a boiling point of 90–170° C. to obtain unsolvated β-hydroxyethylthiocelestosaminide.

10. A process which comprises subjecting a compound selected from the group consisting of desalicetin and celesticetin to hydrazinolysis with hydrazine hydrate to form β-hydroxyethylthiocelestosaminide hydrazine solvate and isolating the β-hydroxyethylthiocelestosaminide hydrazine solvate.

11. A process which comprises heating β-hydroxyethylthiocelestosaminide hydrazine solvate with a solvent for β-hydroxyethylthiocelestosaminide having a boiling point of 90–170° C. and isolating β-hydroxyethylthiocelestosaminide.

12. A process which comprises heating β-hydroxyethylthiocelestosaminide hydrazine solvate with dimethylformamide and isolating the β-hydroxyethylthiocelestosaminide.

13. A compound as defined in claim 1, β-hydroxyethylthiocelestosaminide, in its essentially pure crystalline form.

References Cited by the Examiner

UNITED STATES PATENTS

| | | | |
|---|---|---|---|
| 2,802,819 | 8/57 | Lederer et al. | 260—210 |
| 2,827,453 | 3/58 | Baker et al. | 260—210 |
| 2,830,983 | 4/58 | Limieux | 260—210 |
| 2,851,463 | 9/58 | Hinman et al. | 260—210 |
| 2,928,844 | 3/60 | De Boer et al. | 260—210 |
| 3,057,850 | 10/62 | Danielli et al. | 260—210 |

LEWIS GOTTS, *Primary Examiner.*